(12) United States Patent
Lapeyrouse

(10) Patent No.: US 10,918,116 B2
(45) Date of Patent: Feb. 16, 2021

(54) COMBINATION CONFECTIONERY PRODUCT ASSEMBLY

(71) Applicant: Paul J. Lapeyrouse, Marrero, LA (US)

(72) Inventor: Paul J. Lapeyrouse, Marrero, LA (US)

(*) Notice: Subject to any disclaimer, the term of this patent is extended or adjusted under 35 U.S.C. 154(b) by 309 days.

(21) Appl. No.: 16/012,864

(22) Filed: Jun. 20, 2018

(65) Prior Publication Data
US 2019/0387766 A1 Dec. 26, 2019

(51) Int. Cl.
*A23G 3/20* (2006.01)
*B65D 47/08* (2006.01)
*A23G 3/34* (2006.01)
*A23G 3/54* (2006.01)

(52) U.S. Cl.
CPC ......... *A23G 3/2007* (2013.01); *A23G 3/0065* (2013.01); *A23G 3/343* (2013.01); *A23G 3/54* (2013.01); *B65D 47/0838* (2013.01)

(58) Field of Classification Search
CPC .... A23G 3/0065; A23G 3/2007; A23G 3/343; A23G 3/54; B65D 47/0833; B65D 47/0838
USPC ....................................................... 426/302
See application file for complete search history.

(56) References Cited

U.S. PATENT DOCUMENTS

| | | |
|---|---|---|
| 3,326,358 A | 6/1967 | Singleton |
| D284,838 S | 7/1986 | Cillario |
| 4,938,975 A | 7/1990 | Waller |
| 5,209,565 A | 5/1993 | Goncalves |
| 5,324,527 A | 6/1994 | Coleman |
| 5,370,884 A | 12/1994 | Coleman |
| D359,607 S | 6/1995 | Yun |
| D403,579 S | 1/1999 | Gallart et al. |
| 5,993,870 A | 11/1999 | Hoeting et al. |
| D437,219 S | 2/2001 | Gallart et al. |
| 6,187,350 B1 | 2/2001 | Gallart et al. |
| 6,187,352 B1 | 2/2001 | Crosbie |
| 6,190,226 B1 | 2/2001 | Conconi |
| 6,221,407 B1 | 4/2001 | Gallart et al. |
| 6,289,906 B1 | 9/2001 | Vanden Dries et al. |
| D450,591 S | 11/2001 | Gallart et al. |
| D451,259 S | 12/2001 | Yoon |
| 6,399,126 B1 | 6/2002 | Weldon, Jr. |
| D468,631 S | 1/2003 | Hart et al. |
| 6,660,316 B2 | 12/2003 | Hart et al. |
| D490,961 S | 6/2004 | Hart et al. |
| D684,478 S | 6/2013 | Castillo |
| D810,390 S | 1/2018 | Lapeyrouse, Jr. |
| 2002/0142073 A1 | 10/2002 | Baker |
| 2012/0292349 A1 | 11/2012 | Zarou |

FOREIGN PATENT DOCUMENTS

| | | |
|---|---|---|
| GB | 2297306 A | 7/1996 |
| WO | 02098764 A1 | 12/2002 |

*Primary Examiner* — Jyoti Chawla
(74) *Attorney, Agent, or Firm* — Cahn & Samuels, LLP

(57) ABSTRACT

A combination confectionery product for selective dispensing of a flowable fluid food product from a capped compressible container onto a solid food product mounted on a handle that is releasably securable within a chamber enclosure, a cantilevered supporting platform projecting from the chamber enclosure to support the compressible container and a cantilevered projection for removably engaging the compressible container cap and secure the container on the supporting platform.

11 Claims, 2 Drawing Sheets

COMBINATION CONFECTIONERY PRODUCT ASSEMBLY

I. FIELD OF THE INVENTION

This invention relates to a combination food product assembly and methods particularly suited for user consumption of a solid food product having a second, flowable food product dispensed thereon. The invention features at least one chamber for retaining a first, solid food product and at least one cantilevered platform projecting from the chamber housing which together with at least a pair of cooperating cantilevered arms detachably retains and supports a container with a second, flowable food product.

II. BACKGROUND OF THE INVENTION

Hard candy confections are traditionally sold in basic packaging such as lollipops manufactured on paper sticks and wrapped in a paper with a wax seal, or candy canes wrapped in cellophane. Recent improvements to hard candy packaging include, for example, more complex packaging, such as a battery-powered motorized base that houses the stick of a lollipop and enables the consumer of the lollipop to have the confection spin while consuming it. U.S. Pat. No. 5,370,884 discloses a combination confectionery product with a housing for a lollipop and a contiguous container for a particulate candy powder where the user removes a cap from the housing to expose the lollipop, moistens the lollipop which is then dipped into the contiguous container to coat the lollipop with the particulate powder.

Another confection design and packaging development that allows for the hard candy confection to be combined with dips, liquids, powders, etc. and co-packaged to enhance the enjoyment of the combination confection is illustrated in U.S. Design Pat. D810,390. That patent features a unique design that among other features includes a longitudinally detachable, tongue-in-groove engaging, laterally disposed multi-chamber confectionary housing dispenser wherein hard candy is housed in a first chamber and a dispensable second, liquid confection is housed in a second discrete chamber. The liquid is contained in a resilient, compressible, nozzled/nippled dispenser reservoir mounted within the second discrete chamber which defines a rigid outer shell surrounding a substantial portion of the nippled dispenser which also provides an opening to allow for the user to directly apply pressure to the compressible reservoir and eject the contained liquid through the nozzle and onto the hard candy confection which has been removed from the first chamber. The product allows for separation of the two chambers by sliding the respective chambers longitudinally relative to each other until the tongue and groove elements disengage.

A unitary, multi-chambered confectionary product package featuring an over-and-under oriented flavoring liquid reservoir and hard candy housing is disclosed in U.S. Pat. No. 6,660,316. That product does not allow for the detachment/separation of the chambers but does provide a hard candy confection retaining chamber and squeezable flavoring fluid where the hard candy is removable from the lower chamber and the upper and lower chambers, as a unitary body, are manipulated to dispense the flavored liquid from the reservoir in the upper chamber.

III. SUMMARY OF THE INVENTION

The present application discloses a further type of food product having features that are novel in light of the aforementioned references to provide improvements thereover. Specifically, the present invention features a single-chamber housing for a solid first confectionery, wherein a second, flowable fluid/liquid confectionery contained in an independent vessel can be attached to and detached from the first confectionery's housing. This allows for the easy removal of the independent vessel while maintaining the integrity of the housing.

It is an object of the present invention to provide a new confectionery dispensing product that overcomes shortcomings of the prior art and to provide a new type of confectionary dispenser and method.

This and other objects are satisfied by a confectionery dispensing product for a solid food product and a flowable fluid food product, comprising: a solid food product enclosure with an opening, said enclosure including a base and an orthogonally disposed side wall projecting from the base a select distance from the base to form a chamber for receiving a solid food product of complementary dimensions; an enclosure cap for the enclosure incorporating a solid food product retainer, said enclosure cap being correspondingly dimensioned to the enclosure opening so as to be releasably securable to the enclosure; a compressible fluid dispensing container of a select height, select width, and a select depth, said container defining a compressible body with an open-ended neck projecting from the body, said first open-ended neck including a first member of a cooperating releasable securing element; a container cap with a first cover segment dimensionally conforming to and matable with a second neck segment, an integrated fluid dispensing nozzle projecting axially from and forming a continuous fluid passage with said second neck segment, said first cover segment including a projecting nozzle plug and being dimensioned to cover and obstruct fluid flow from said nozzle when said first cover segment is mated with said second neck segment to cover the nozzle and the second neck segment, the second neck segment including a second member of a cooperating securing element where said second neck segment is secured to said open-ended neck upon engagement of said first and second members of said cooperating releasable securing element, and released upon disengagement of said first and second members; a cantilevered supporting platform projecting from the solid food product enclosure dimensionally corresponding to the select width and depth of the compressible fluid dispensing container to receive and support said container thereon; and an engaging projection being releaseably engageable with said second neck segment.

The above stated object is also satisfied by an embodiment of a confectionery dispensing product for a solid food product and a flowable fluid food product, comprising a solid food product open-ended enclosure with an opening, said enclosure including a base and an orthogonally disposed side wall projecting from the base a select distance from the base to form a chamber for receiving a solid food product of complementary dimensions; an enclosure cap for the open-ended enclosure incorporating a solid food product retainer, said enclosure cap being correspondingly dimensioned to the enclosure opening so as to be releasably securable to the enclosure; a compressible fluid dispensing container of a select height, select width, and a select depth, said container defining a compressible body with an open-ended neck projecting from the body, said open ended neck including a first member of a cooperating releasable securing element, a container cap with a first cover segment dimensionally conforming to and matable with a second neck segment, an integrated fluid dispensing nozzle projecting axially from and forming a continuous fluid passage with said second neck segment, said first cover segment including a projecting nozzle plug and being dimensioned to cover and obstruct fluid flow from said nozzle when said first cover segment is mated with said second neck segment to cover the nozzle and the second neck segment, the second neck segment including a second member of a cooperating securing element where said second neck segment is secured to said open-ended neck upon engagement of said first and second members of said cooperating releasable securing element, and released upon disengagement of said first and second members; a cantilevered supporting platform projecting from the solid food product open-ended enclosure dimensionally corresponding to the select width and depth of the compressible fluid dispensing container to receive and support said container thereon; and a pair of opposed resilient cantilevered arms spaced apart by a distance corresponding to the select depth and spaced from the platform at a height corresponding to the select height of the body of the compressible fluid dispensing container, said resilient cantilevered arms being releasably engageable with said second neck segment.

The foregoing and still other objects are satisfied by a method for using a confectionery dispensing product for a solid food product and a flowable fluid food product where the confectionery dispensing product includes a solid food product open-ended enclosure with an opening, said enclosure including a base and an orthogonally disposed side wall projecting from the base a select distance from the base to form a chamber for receiving a solid food product of complementary dimensions; an enclosure cap for the open-ended enclosure incorporating a solid food product retainer said enclosure cap being correspondingly dimensioned to the enclosure opening so as to be releasably securable to the enclosure; a compressible fluid dispensing container of a select height, select width, and a select depth, said container defining a compressible body with an open-ended neck projecting from the body, said open ended neck including a first member of a cooperating releasable securing element; a container cap with a first cover segment dimensionally conforming to and matable with a second neck segment, an integrated fluid dispensing nozzle projecting axially from and forming a continuous fluid passage with said second neck segment, said first cover segment including a projecting nozzle plug and being dimensioned to cover and obstruct fluid flow from said nozzle when said first cover segment is mated with said second neck segment to cover the nozzle and the second neck segment, the second neck segment including a second member of a cooperating securing element where said second neck segment is secured to said open ended upon engagement of said first and second members of said cooperating releasable securing element neck, and released upon disengagement of said first and second members; a cantilevered supporting platform projecting from the solid food product open-ended enclosure dimensionally corresponding to the select width and depth of the compressible fluid dispensing container to receive and support said container thereon; and a pair of opposed resilient cantilevered arms spaced apart by a distance corresponding to the select depth and spaced from the platform at a height corresponding to the select height of the body of the compressible fluid dispensing container, said resilient cantilevered arms being releasably engageable with said second neck segment, the method comprising the steps of: manipulating the enclosure cap to remove the solid food product from the enclosure; applying sufficient force to induce flexing of the resilient arms to overcome the frictional engagement force and disengage from the second neck segment and release the fluid dispensing container from the platform; opening the container cap to unplug the nozzle; moving the nozzle to proximity with the solid food product; compressing the fluid dispensing container to dispense the second flowable food product onto the solid food product; closing the container cap and plugging the nozzle; and aligning second neck segment of the fluid dispensing container with the resilient arms and applying sufficient force to induce flexing thereof to reposition the container onto the platform in a manner to be secured with the solid food product enclosure.

The foregoing and still other objects are satisfied by an assembly for retaining a solid food product and a fluid food product for consumption, said assembly comprising: a chamber having a cavity, a bottom, and an exterior wall; a chamber cap, defining a chamber cap member, said chamber cap member of select geometry to be secured by said chamber and be selectively disengageable therefrom, a solid food product mounting element, and a handle segment, said handle segment extending laterally from the center exterior of said chamber cap; a pair of opposed resilient clip fingers projecting from said exterior wall; a supporting platform projecting from said exterior wall being spaced from and parallel in orientation to said resilient clip fingers; projecting wings, said projecting wings projecting from exterior wall and extending from the base of said resilient clip fingers to the supporting platform; and a compressible fluid container for containment of a fluid flowable food product, including a compressible body of select geometry to be removably received and selectively retained on said platform by said resilient clip fingers, a mating threaded member incorporating a fluid dispensing cylindrical duct permanently affixed above the compressible body and narrower in diameter than said compressible body, with threading disposed on the exterior of said cylindrical duct; and a hinged cap, including a cap body, a nozzle, wherein said nozzle is permanently affixed medially within cap body and having axial passage therethrough, a cap top, a hinge, said hinge connecting said cap top to said cap body, a nozzle cap, said nozzle cap of select geometry to selectively seal opening of said nozzle, and a threaded cap channel, said threaded cap channel of corresponding diameter to said mating threaded member of compressible body and engagingly mateable therewith, wherein said threaded cap channel.

Particular terminology used herein is for the purpose of describing particular embodiments only and is not intended to be limiting of the invention and is intended to mean the following:

References to "one embodiment", "an embodiment", or "in embodiments" mean that the feature being referred to is included in at least one embodiment of the invention. Moreover, separate references to "one embodiment", "an embodiment", or "embodiments" do not necessarily refer to the same embodiment; however, neither are such embodiments mutually exclusive, unless so stated, and except as will be readily apparent to those skilled in the art. Thus, the invention can include any variety of combinations and/or integrations of the embodiments described herein.

As used herein, the singular forms, "a", "an" and "the" are intended to include the plural forms as well, unless the context clearly indicates otherwise. It will be further understood that the root terms "include" and/or "have", when used in this specification, specify the presence of stated features, steps, operations, elements, and/or components, but do not preclude the presence or addition of at least one other feature, step, operation, element, component, and/or groups thereof.

As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus.

As used herein, and unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

As used herein "substantially," "generally," and other words of degree are relative modifiers intended to indicate permissible variation from the characteristic so modified. It is not intended to be limited to the absolute value or characteristic which it modifies but rather possessing more of the physical or functional characteristic than its opposite, and preferably, approaching or approximating such a physical or functional characteristic.

An embodiment of the invention is depicted in FIGS. 1-6 attached hereto. The accompanying illustrations in FIGS. 1-6 depict an exemplary embodiment of the invention. It should be understood by those skilled in the art that many modifications and embodiments of the invention will come to mind to which the invention pertains, having benefit of the teaching presented in the foregoing description and associated drawings. It is therefore understood that the invention is not limited to the specific embodiment disclosed herein, and that many modifications and other embodiments of the invention are intended to be included within the scope of the invention. Moreover, although specific terms are employed herein, they are used only in generic and descriptive sense, and not for the purposes of limiting the invention.

Given the following description of the drawings, the inventive confectionery dispensing product should become evident to a person of ordinary skill in the art.

IV. BRIEF DESCRIPTION OF THE DRAWINGS

V. DETAILED DESCRIPTION OF THE DRAWINGS

With reference now to the drawings, in particular to FIGS. 1-6 thereof, apparatuses of a confectionery dispensing product, embodying features, principles, and concepts of the confectionery dispensing product invention are described.

Figure 1:
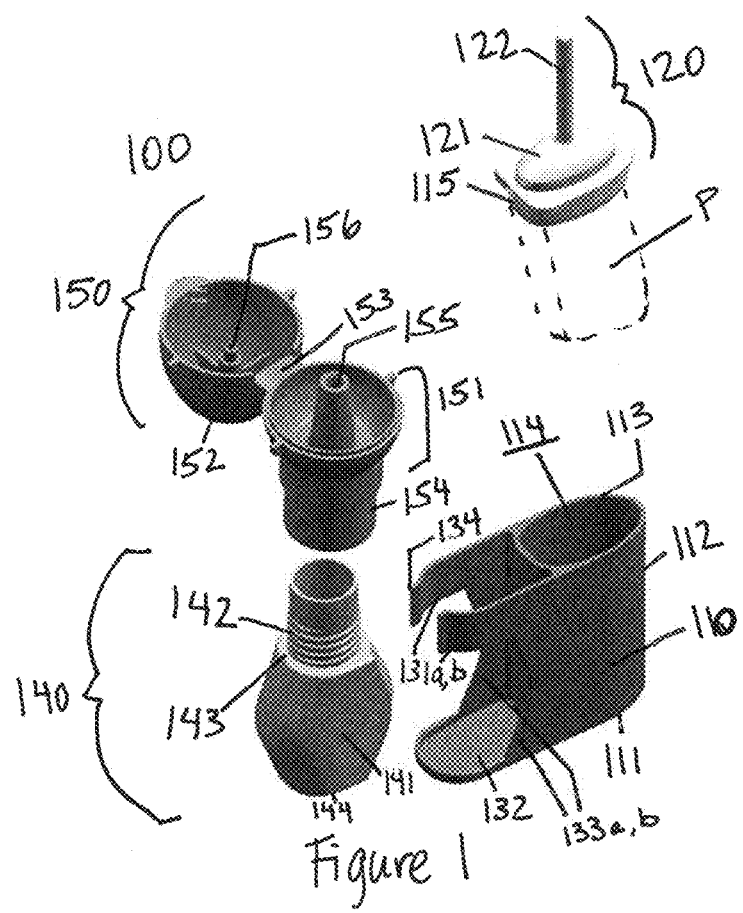
FIG. 1 illustrates an exploded view of the confectionery dispensing product according to at least one embodiment of the present invention.

FIG. 1 illustrates an example of the confectionery dispensing product 100 including a chamber 110 into which a first solid food product P can be removably housed. The solid food product P is depicted in FIG. 1 in broken lines.

The chamber 110 comprises a base/bottom 111 and a wall 112 orthogonally disposed to the base/bottom 111 defining an enclosed space 114 with a generally ovate cross-section and defining a perimetric lip 113 generally parallel to and spaced from the base/bottom 111 a distance sufficient to accommodate the solid food product P. The lip 113 is dimensioned to receive a top cap 120 which comprises a chamber cap member 121 and a projecting handle segment 122. The chamber cap member 121 also provides a solid food product P mounting element such as cuff 115 and is dimensioned to possess a geometry suitable to be removably retained inside the opening 114 of the chamber 110 and is equipped to support a solid food product P. Accordingly, the chamber cap member 121 is dimensionally complementary to the opening established by the lip 113 to allow for an interference fit therewith while also permitting removal therefrom.

The confectionery dispensing product 110 features a cantilevered platform 132 projecting from the bottom 111 and a pair of spaced, opposed, deformably resilient, curved, cantilevered arms 131a and 131b respectively projecting from the front and back segments of wall 112 proximate to the lip 113. In the illustrated example, the cantilevered arms 131a and 131b define an open perimeter generally dimensionally conforming to and spaced above the underlying cantilever platform 132. FIG. 1 also illustrates the compressible fluid dispensing container 140, which selectively contains the second fluid flowable food product which may be liquid or particulate solid (not depicted). The compressible fluid dispensing container 140 comprises a compressible body 141 made of a material of sufficient flexibility to allow compression for expelling fluid contents therefrom, while sufficiently rigid to retain its shape and structure when uncompressed. The upper portion of the compressible body 141 ends in a shoulder 143 which encircles the perimeter of the upper portion of the compressible body 141 and is generally perpendicular to the compressible body 141 and parallel to the base 144 of the compressible body 141. Affixed to the shoulder 143 is a matingly threaded member 142 that is cylindrical in shape and of a select circumference that is narrower than the compressible body 141. The threaded member 142 comprises threading on its exterior for engaging with a corresponding threaded channeled neck 154.

Also depicted in FIG. 1 is a hinged cap 150. The hinged cap 150 is separable from the compressible fluid container 140 via the matingly threaded member 142. The base of the hinged cap 150 comprises the threaded channeled neck 154 with interior threading that is of a corresponding circumference to the threaded member 142 of the compressible fluid container 140 to removably interthread therewith and thereby engage with the compressible fluid container 140. A cap body 151 is permanently affixed above the threaded channeled neck 154 and houses a nozzle 155 medially and axially disposed in the center of the cap body 151. When the matingly threaded member 142 and the threaded channeled neck 154 are engaged, the nozzle 155 is axially aligned with the threaded member 142 and threaded channeled neck 154 to provide passage therethrough of the contents of the compressible fluid container 140 upon compression. The cap body 151 is attached to a cap top 152 via a hinge 153 to pivot between a nozzle exposing, open position and a nozzle covering, sealed position. In this example, the hinged cap 150 is formed from thermoplastic and therefore the hinge 153 is integrally molded with the cap body 151 and cap top 152. The cap top 152 covers the cap nozzle 155 and includes a co-acting nozzle sealing plug 156 dimensioned to engage and seal the top opening of the nozzle 155 when the cap top is pivoted to the closed position to prevent flow of the fluid contents of the compressible dispensing fluid container 140.

The compressible dispensing container 140 is detachably secured to the chamber 110 by seating it on the platform 132 and flexing the deformable arms 131a and 131b to engage the neck 154 of the cap 150. To this end, the height and curvature of the deformable cantilevered arms 131a and 131b preferably are sufficient to cammingly engage a substantial portion of the neck 154 to frictionally releasably retain the compressible fluid container 140 on the supporting platform 132. The cantilevered arms 131a and 131b may include a flared tip 134 to facilitate reinsertion of the container 140 on the platform 132. A variation of the illustrated "snap-on" cantilevered arm embodiment employed to secure the dispensing container 140 on the platform 132 would be a flexible projection form the chamber that features a terminal neck retaining ring dimensioned to permit flexing and insertion of the neck 154 therein to engage the container shoulder 143 or a complementarily-dimensioned perimetric annulus on the cap exterior.

The illustrated example also features a pair of optional wings 133a and 133b projecting from the wall 112 of the chamber 110 and extending between the platform 132 and the arms 131a and 131b respectively. The projecting wings 133a and 133b are dimensioned to define a guide slot corresponding to the width the compressible body 141 when the compressible fluid container 140 is secured on the platform 132.

Figure 2:
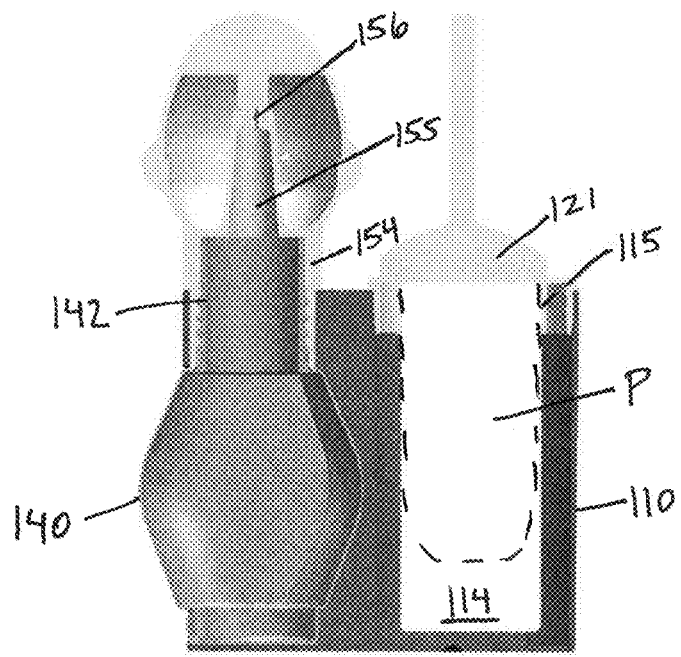
FIG. 2 illustrates a cutaway sectional view of the confectionery dispensing product of FIG. 1.

FIG. 2, the cutaway view of the exemplary confectionery dispensing product 100 illustrated in FIG. 1, provides an additional illustration of the inter-threading engagement of the threaded member 142 and the threaded channeled neck 154. As a substitute for threading, the container and cap may feature alternative known closures such as a snap-fit closure. Referring to cooperating structures of the chamber 110 with the capped cavity 114 housing the solid food product P (depicted in broken lines), the structure permits repeated removal and reinsertion by the user. Also illustrated is the engagement of the sealing plug 156 with the opening of the nozzle 155.

Figure 3:
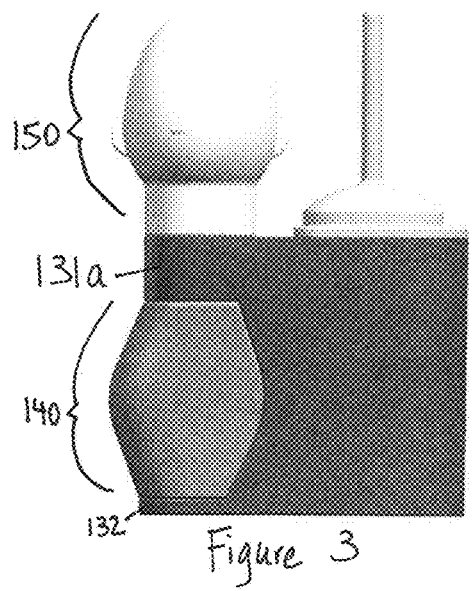
FIG. 3 illustrates a front view of the confectionery dispensing product of FIG. 1.
Figure 4:
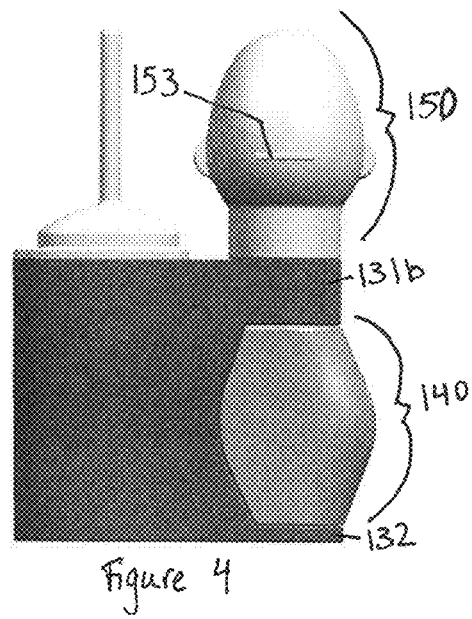
FIG. 4 illustrates a back view of the confectionery dispensing product of FIG. 1.

FIGS. 3 and 4 depict front and back views of the confectionery dispensing product 100 of FIG. 1. In both figures, the compressible fluid container 140 is engaged with the hinged cap 150 via threaded engagement and both are secured on the cantilevered supporting platform 132 by arms 131a and 131b. FIG. 4 also depicts the hinge 153 of the hinged cap 150 when the hinged cap 150 is closed.

Figure 5:
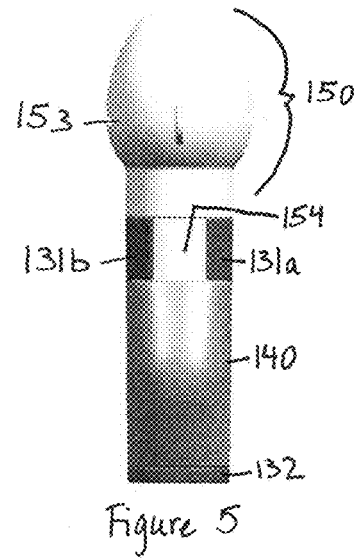
FIG. 5 illustrates a side view of the confectionery dispensing product of FIG. 1.

FIG. 5 depicts a side view of the confectionery dispensing product 100 and the equatorial orientation of the hinge 153 with the hinged cap 150. The side profile view also illustrates the resilient cantilever arms 131a and 131b engaging the neck 154 and securing the compressible fluid container 140 and hinged cap 150 on the supporting platform 132.

Figure 6:
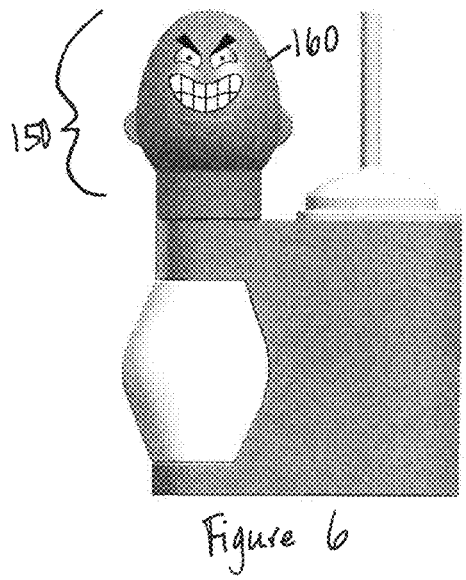
FIG. 6 illustrates an embodiment of FIG. 1 including a humanoid face design.

FIG. 6 depicts a front view of an example of the confectionery dispensing product featuring customization of the hinged cap 150. The customizable visual feature 160 depicted in this example is a humanoid cartoon face appearing on the front face of the hinged cap 150. It should be apparent that the cap 150 may be decorated with any artistic design and may even be customizable, for example, by using decals depicting celebrity and film character likenesses, animal cartoon characters, and the like.

In view of the foregoing description, without departing from the intent of the invention which employs a cantilever support and securing arrangement for a compressible discharge container associated with a confectionery housing, alternative embodiments should be apparent. For example, as briefly described above, a ring may replace the cantilevered arms. In such an embodiment, a flexibly rigid mount affixes a ring to the wall proximate to the lip. The ring defines a perimeter spaced above the underlying cantilever platform and is of such diameter to allow passage therethrough of the hinged cap. An alternative embodiment features a hinged cap that is narrower than in the illustrated embodiment and, in a further alternative, the hinged cap having a diameter corresponding to that of the neck. In another embodiment, the compressible fluid container, the neck, and the hinged cap dimensionally comprise a cylinder. In an embodiment of the invention having a ring supporting projection, the user passes the hinged cap through the ring and continues passage movement until the ring engages with the shoulder of the compressible fluid container, wherein the shoulder has a diameter wider than that of the ring. The engagement of the ring with the shoulder inhibits further passage of the compressible fluid container through the ring. The flexible mount becomes increasingly displaced from its resting position due to the resistance tension upon further pushing of the compressible fluid body through the ring.

In an alternate embodiment, the base of the compressible fluid container is cambered or beveled to cammingly facilitate placement of the compressible fluid container on the supporting platform by reducing frictional resistance between the supporting platform and the base of the compressible fluid container resulting from the push-back force produced by the engagement of the ring and the shoulder.

The foregoing embodiments are examples that are not to meant be limiting of the present invention, variations of which are contemplated to be within the description and/or scope thereof given the foregoing. Those skilled in the art should appreciate that various adaptations and modifications of the example and alternative embodiments described above can be devised without departing from the scope and spirit of the invention. Therefore, it is to be understood that, within the scope of the claims, the invention may be practiced other than as specifically described herein.

I claim:

1. A confectionery dispensing product for a solid food product and a flowable fluid food product, comprising:

a solid food product enclosure with an opening, said enclosure including a base and an orthogonally disposed side wall projecting from the base a select distance from the base to form a chamber for receiving a solid food product of complementary dimensions;

an enclosure cap for the enclosure incorporating a solid food product retainer, said enclosure cap being correspondingly dimensioned to the enclosure opening so as to be releasably securable to the enclosure;

a compressible fluid dispensing container of a select height, select width, and a select depth, said container defining a compressible body with an open-ended neck projecting from the body, said first open-ended neck including a first member of a cooperating releasable securing element, a container cap with a first cover segment dimensionally conforming to and matable with a second neck segment, an integrated fluid dispensing nozzle projecting axially from and forming a continuous fluid passage with said second neck segment, said first cover segment including a projecting nozzle plug and being dimensioned to cover and obstruct fluid flow from said nozzle when said first cover segment is mated with said second neck segment to cover the nozzle and the second neck segment, the second neck segment including a second member of a cooperating securing element where said second neck segment is secured to said open-ended neck upon engagement of said first and second members of said cooperating releasable securing element, and released upon disengagement of said first and second members;
a cantilevered supporting platform projecting from the solid food product enclosure dimensionally corresponding to the select width and depth of the compressible fluid dispensing container to receive and support said container thereon; and
an engaging projection being releasably engageable with said second neck segment.

2. The confectionery dispensing product of claim 1 where the engaging projection is a pair of opposed resilient cantilevered arms spaced apart by a distance corresponding to the select depth and spaced from the platform at a height corresponding to the select height of the body of the compressible fluid dispensing container.

3. The confectionery dispensing product of claim 2 where resilient cantilevered arms include a curved surface to provide enhanced frictional engagement with said second neck segment.

4. The confectionery dispensing product of claim 1 where the engaging projection is a ring having a select diameter to allow passage therethrough of said hinged cap for engagement with a shoulder of the compressible fluid container, and affixed by a flexibly rigid mount at a height corresponding to the select height of the body of the compressible fluid dispensing container.

5. The confectionery dispensing product of claim 1 where the cantilevered supporting platform is co-planar with and projecting from the base of the enclosure.

6. The confectionery dispensing product of claim 1 further comprising a handle projecting from the enclosure cap to facilitate manipulation of the enclosure cap.

7. The confectionery dispensing product of claim 1 where the first element of the cooperating securing member is threading formed on the outer surface of the open-ended neck and the second element of the cooperating securing member is complementary threading formed on the inside surface of the cap neck.

8. A method for using a confectionery dispensing product for a solid food product and a flowable fluid food product where the confectionery dispensing product includes a solid food product enclosure with an opening, said enclosure including a base and an orthogonally disposed side wall projecting from the base a select distance from the base to form a chamber for receiving a solid food product of complementary dimensions; an enclosure cap for the enclosure incorporating a solid food product retainer said enclosure cap being correspondingly dimensioned to the enclosure opening so as to be releasably securable to the enclosure; a compressible fluid dispensing container of a select height, select width, and a select depth, said container defining a compressible body with an open-ended first neck projecting from the body, said open ended neck including a first member of a cooperating releasable securing element; a container cap with a first cover segment dimensionally conforming to and matable with a second neck segment, an integrated fluid dispensing nozzle projecting axially from and forming a continuous fluid passage with said second neck segment, said first cover segment including a projecting nozzle plug and being dimensioned to cover and obstruct fluid flow from said nozzle when said first cover segment is mated with said second neck segment to cover the nozzle and the second neck segment, the second neck segment including a second member of a cooperating securing element where said second neck segment is secured to said open ended upon engagement of said first and second members of said cooperating releasable securing element neck, and released upon disengagement of said first and second members;
a cantilevered supporting platform projecting from the solid food product enclosure dimensionally corresponding to the select width and depth of the compressible fluid dispensing container to receive and support said container thereon; and a resiliently flexible engaging projection being releasably engageable with said second neck segment and spaced from the platform at a height corresponding to the select height of the body of the compressible fluid dispensing container, said resiliently flexible engaging projection being releasably engageable with said second neck segment, the method comprising the steps of:
manipulating the enclosure cap to remove the solid food product from the enclosure;
applying sufficient force to induce flexing of the resilient arms to overcome the frictional engagement force and disengage from the second neck segment and release the fluid dispensing container from the platform;
opening the container cap to unplug the nozzle;
moving the nozzle to proximity with the solid food product;
compressing the fluid dispensing container to dispense the second flowable food product onto the solid food product;
closing the container cap and plugging the nozzle; and
aligning second neck segment of the fluid dispensing container with the resiliently flexible engaging projection and applying sufficient force to induce flexing thereof to reposition the container onto the platform in a manner to be secured with the solid food product enclosure.

9. An assembly for retaining a solid food product and a fluid food product for consumption, said assembly comprising:
a chamber having a cavity, a bottom, and an exterior wall;
a chamber cap, defining a chamber cap member, said chamber cap member being of select geometry to be secured by said chamber and be selectively disengageable therefrom, a solid food product mounting element, and a handle segment, said handle segment extending laterally from the center exterior of said chamber cap;
a pair of opposed resilient clip fingers projecting from said exterior wall;
a supporting platform projecting from said exterior wall being spaced from and parallel in orientation to said resilient clip fingers;
projecting wings, said projecting wings projecting from exterior wall and extending from the base of said resilient clip fingers to the supporting platform; and
a compressible fluid container for containment of the fluid food product, including a compressible body of select geometry to be removably received and selectively retained on said platform by said resilient clip fingers, a mating threaded member incorporating a fluid dispensing cylindrical duct with an interior surface and an exterior surface permanently affixed above the compressible body and narrower in diameter than said compressible body, with threading disposed on the exterior surface of said cylindrical duct; and
a hinged cap, including a cap body, a nozzle, wherein said nozzle is permanently affixed medially within the cap body and having axial passage therethrough, a cap top, a hinge, said hinge connecting said cap top to said cap body, a nozzle cap, said nozzle cap being of select geometry to selectively seal an opening of said nozzle, and a threaded cap channel, said threaded cap channel being of corresponding diameter to said mating threaded member of compressible body and engagingly mateable therewith, wherein said threaded cap channel is of select diameter to be frictionally secured by the resilient clip fingers.

10. The assembly according to claim 9, wherein said solid food product being mounted to said chamber cap member.

11. The assembly according to claim 9, wherein the compressible fluid container includes a pair of opposed generally flat sides and a pair of opposed, outwardly curving sides.

\* \* \* \* \*